United States Patent Office 2,971,990
Patented Feb. 14, 1961

2,971,990

2-BROMO-1,1,1,2-TETRAFLUOROETHANE

Eric R. Larsen, Midland, Mich., assignor to The Dow Chemical Company, Midland, Mich., a corporation of Delaware No Drawing. Filed Sept. 25, 1957, Ser. No. 686,025

3 Claims. (Cl. 260—653)

This invention relates to a novel bromofluoroethane and is more particularly concerned with 2-bromo-1,1,1,2-tetrafluoroethane and a method for its preparation.

2-bromo-1,1,1,2-tetrafluoroethane is a colorless gas boiling at 5–6° C., is non-explosive and non-inflammable, and has shown anesthetic properties when administered to both dogs and humans in the conventional manner of administering anesthetics in concentrations of about 25 percent with 75 percent oxygen.

The compound of the present invention is readily prepared by the bromination of 1,1,1,2-tetrafluoroethane at temperatures above about 400° C. for a contact time greater than about two seconds. The product of the present invention may be separated from its reaction components by fractional distillation.

The following example is given to illustrate a process for preparing the compound of the present invention but is not to be construed as limiting the invention thereto.

Example

A tube packed with glass rings to facilitate heat transfer, and having an internal diameter of ¾ inch, was placed in an open coil electric furnace in a manner such that 24 inches of the tube was maintained at a temperature of approximately 500° C., when the furnace was heated. 417 grams of 1,1,1,2-tetrafluoroethane were passed through liquid bromine and the resulting mixture (1.36 moles of bromine per mole of tetrafluoroethane) passed through the tube at a rate to provide a contact time within the heated zone of 3.25 seconds. A total of 5.45 moles of bromine was carried through the tube. The effluent gases were passed through an air-cooled trap, an ice-water-cooled trap, a water scrubber, and a Dry-Ice-cooled trap. Titration of the scrubber water indicated a conversion of 72 percent based on the tetrafluoroethane charged. The organic materials collected in the ice-water-cooled trap and in the Dry-Ice-cooled trap were combined and the material boiling below 15° C. stripped off. Redistillation of this low boiling material yielded 103 grams of $CF_3CHBrF$ as a colorless gas, boiling at 5–6° C.

Various modifications may be made in the present invention without departing from the spirit or scope thereof and it is to be understood that I limit myself only as defined in the appended claims.

I claim:
1. 2-bromo-1,1,1,2-tetrafluoroethane.
2. The process which comprises: passing a mixture of bromine and 1,1,1,2-tetrafluoroethane into a reaction zone maintained at a temperature of about 500° C. for a contact time of about 3.25 seconds, and, separating 2-bromo-1,1,1,2-tetrafluoroethane from the reaction mixture.
3. The process which comprises: passing a mixture of bromine and 1,1,1,2-tetrafluoroethane into a reaction zone maintained at a temperature above about 400° C. for a contact greater than two (2) seconds, and, separating 2-bromo-1,1,1,2-tetrafluoroethane from the reaction mixture.

References Cited in the file of this patent

UNITED STATES PATENTS

| | | |
|---|---|---|
| 2,639,301 | Ruh et al. | May 19, 1953 |
| 2,644,845 | McBee | July 7, 1953 |
| 2,658,086 | Ruh et al. | Nov. 3, 1953 |
| 2,849,502 | Suckling et al. | Aug. 26, 1958 |

OTHER REFERENCES

McBee et al.: Ind. and Eng. Chem., volume 39, No. 3, pages 420–21, March 1947.

Park et al.: Journal American Chemical Society, volume 71, July 1949, pages 2339–2340.